June 30, 1925.
L. DECK
1,543,989
COMBINED TESTING PUMP AND GAUGE
Filed Oct. 4, 1923     2 Sheets-Sheet 1
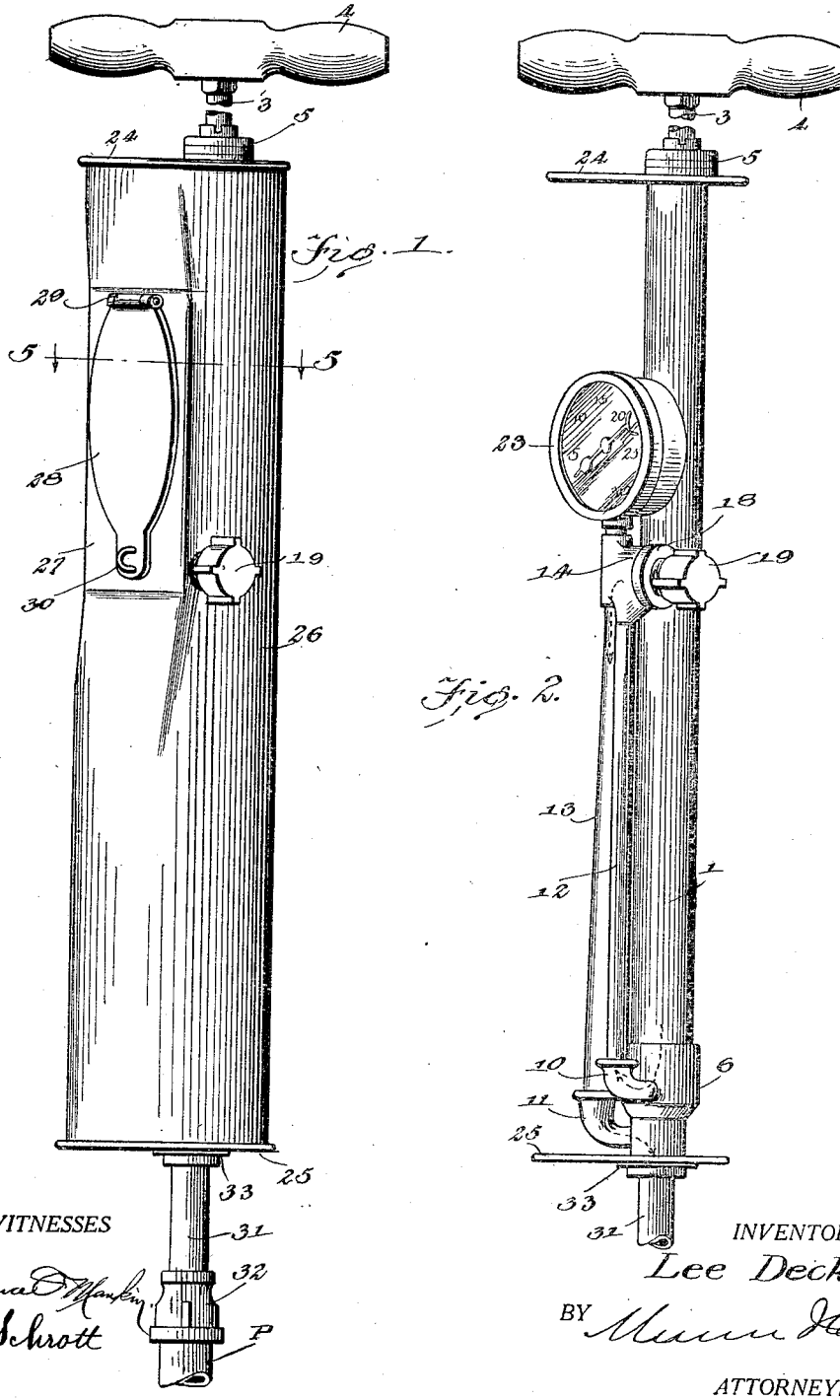
WITNESSES
INVENTOR
Lee Deck,
BY
ATTORNEYS

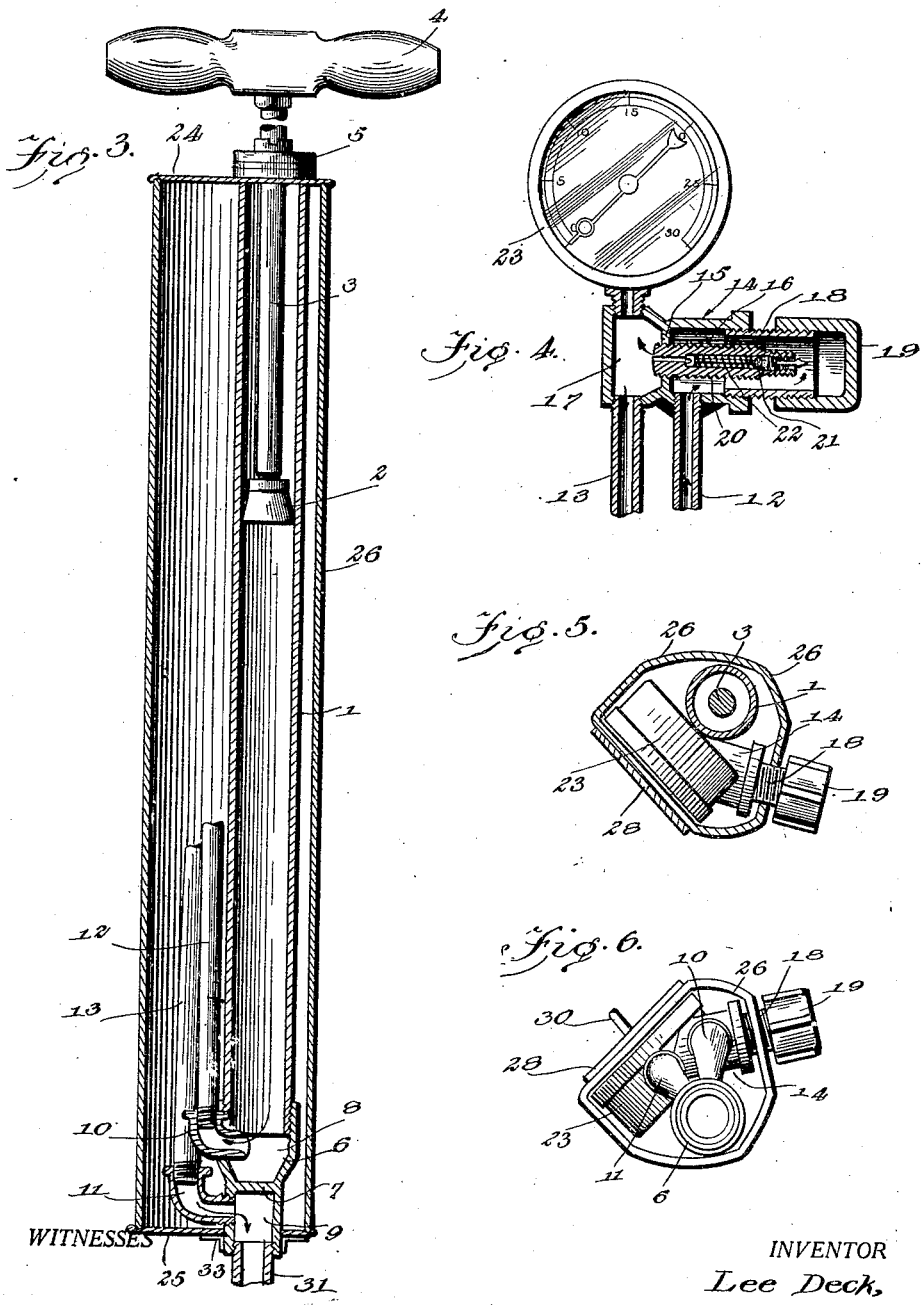

Patented June 30, 1925.

1,543,989

UNITED STATES PATENT OFFICE.

LEE DECK, OF SHREVEPORT, LOUISIANA.

COMBINED TESTING PUMP AND GAUGE.

Application filed October 4, 1923. Serial No. 666,579.

*To all whom it may concern:*

Be it known that I, LEE DECK, a citizen of the United States, and resident of Shreveport, in the parish of Caddo and State of Louisiana, have invented certain new and useful Improvements in Combined Testing Pumps and Gauges, of which the following is a specification.

My invention relates to improvements in testing apparatus for plumbing and the like, and it consists of the constructions, combinations and arrangements herein described and claimed.

An object of the invention is to provide a pump and gauge to be used in testing plumbing and gas installations, said pump and gauge being combined in one casing thereby making a self contained apparatus which is readily and conveniently carried about.

Other objects and advantages will appear in the following specification, reference being had to the accompanying drawings, in which—

Figure 1 is an elevation illustrating the general appearance of the self-contained combined testing pump and gauge.

Figure 2 is an elevation, parts being shown in perspective, illustrating the pump and gauge removed from the casing.

Figure 3 is a longitudinal section of the device, parts being omitted.

Figure 4 is a section of the check valve, showing its relation to the pressure gauge and the two pipes illustrated in Figure 3.

Figure 5 is a cross section on the line 5—5 of Figure 1, and

Figure 6 is an inverted plan view of the device, the bottom of the casing or jacket being removed.

In carrying out my invention provision is made of a pump barrel 1 in which the plunger 2, carried by the plunger rod 3, is reciprocable by the operation of the handle 4 at the exposed end of the plunger rod. The rod 3 passes through a suitable cap 5 which closes the open end of the barrel 1.

The lower end of the barrel 1 is screwed into a reducer fitting 6 which has a partition 7 dividing it into upper and lower chambers 8 and 9 respectively. An elbow 10 is fitted to communicate with the chamber 8. The place where the elbow joins the fitting 6 is soldered so as to be air tight. An elbow 11 communicates with the lower chamber 9, and like the elbow 10 the joint between the elbow 11 and the fitting 6 is soldered.

Mounted on the upper end of the pipes 12 and 13, which respectively extend from the elbows 10 and 11, is a check valve casing 14 which is divided by a partition 15 into chambers 16 and 17 with which the pipes 12 and 13 communicate. The places where these pipes join the body 14 are soldered so as to make an air tight connection.

Screwed into that end of the body 14 adjacent the pivot connection of the pipe 12 is a nipple 18. This nipple is closed by a cap 19. This cap may be removed to permit access to the check valve contained by the chamber 16. This check valve comprises a sleeve 20 in which the valve member 21 (Fig. 4) is operable. A spring 22 keeps this valve seated, and it is only when there is air under pressure in the chamber 16 that the valve 21 is unseated permitting the air to pass through into the chamber 17 and so into the gauge 23 which is connected at the upper end thereof.

The reader will recognize the valve 20 as being very much on the order of the ordinary automobile or bicycle tire valve.

Suitably fastened to the barrel 1 near the extremities thereof are top and bottom members 24 and 25 of a casing or jacket 26 which completely encloses the pump barrel, gauge and the various pipes. This jacket not only affords protection to the pump barrel, etc. but also makes of the pump and gauge a self-contained apparatus which is readily carried about during use in the plumbing or gas fitting trade. As shown in Figures 5 and 6 the casing 26 is particularly shaped to adapt it to the parts that it houses.

Figure 1 shows the casing 26 to be flattened at 27 at the place directly in front of the gauge 23. This flattened face must be provided with an opening so that the gauge may be read. This opening is closed by a door 28 which is hinged at 29 and has provisions 30 for locking it down.

Connected to the fitting 6 at the bottom is a nipple 31 which carries a suitable union 32 and by means of which connection may be made with the system of piping which is to be tested. A portion of said system is shown at P in Figure 1. The bottom 25 is soldered in place at 33 where it joins the lower part of the fitting 6. However, only a few of the joints are described above as being soldered, it is to be understood that all joints in the combined pump and gauge should be leakage of air during a testing operation.

The operation of the pump and gauge may be readily understood from the foregoing description. The handle 4 and plunger 2 are worked up and down, according to the well known operation of a hand pump, so that air is forced from the chamber 6 (Fig. 3) into the pipe 12. This pipe discharges into the chamber 16 of the check valve 14 whence it passes through the check valve and into the chamber 17. The air will first effect a reading on the gauge 23 then pass down the pipe 13 into the lower chamber 9 and out through the system of piping P which is to be tested.

Should all of the joints of the piping P be tight, the reading of the gauge 23 will not vary. Say, for example, that air has been forced into the system of piping until the gauge 23 indicates a pressure of 10 lbs. The combined pump and gauge is left on over night, and if, on the following morning, the gauge 23 still reads 10 lbs. the operator will know that the system of piping P is sound and has no leaks. On the contrary, if the gauge 23 shows a fall in pressure, an inspection of the system must be made for the leaky joint.

Considerable importance is attached to the fact that all of the parts of the combined pump and gauge are in one. Many of the contrivances now in use for the purpose of testing plumbing and gas fitting are composed of a number of separate members which must be combined on the job when a testing operation is undertaken. The likelihood of leaving one or more parts on a job is doubtless quite apparent to the reader. Such likelihood will not happen with the combined pump and gauge inasmuch as the apparatus is self contained.

While the construction and operation of the improved testing apparatus as herein described and claimed is that of a generally preferred form, obviously modifications and changes may be made without departing from the spirit of the invention or the scope of the claims.

I claim:

1. Apparatus of the character described comprising a pump barrel, a plunger operable in the barrel to compress air therein, a fitting at the end of the barrel having a partition dividing it into upper and lower chambers, a nipple in connection with the lower chamber adapted to be joined with a system of piping to be tested, a gauge to indicate the pressure of air delivered to said piping, an associated check valve to the body of which said gauge is connected, pipes respectively furnishing communication between the check valve and gauge and said upper and lower chambers, and a casing enclosing all of the foregoing parts excepting the nipple for protection, said casing having a door through which the gauge may be read.

2. Apparatus of the character described comprising a pump barrel, a fitting at one end of the barrel having a partition dividing it into upper and lower chambers, a top and bottom secured to the upper extremity of the barrel and to the lower part of said fitting respectively, a casing secured between said top and bottom housing the pump barrel and fitting, a gauge situated in the casing, a check valve body having a partition dividing it into two chambers with one of which the gauge has communication, a valve member in the other chamber, and pipes respectively furnishing communication between the various chambers of the valve body and said fitting.

3. Apparatus of the character described comprising a pump barrel having a plunger operable therein, a fitting carried by the barrel at one end having a partition defining two chambers, one being in communication with the barrel and the other communicating with an air outlet, a valve casing having a valve controlling the passage of air from one chamber to the other, a pipe connecting the casing at one side of the valve with that chamber of the fitting which communicates with the pump barrel, a pipe connecting said casing at the other side of the valve with that chamber of the fitting that communicates with the outlet, means by which said outlet is connectible with piping to be tested, and a gauge in communication with the casing at said other side of the valve furnishing a reading of the pressure of air delivered thereto through said valve.

LEE DECK.